United States Patent Office.

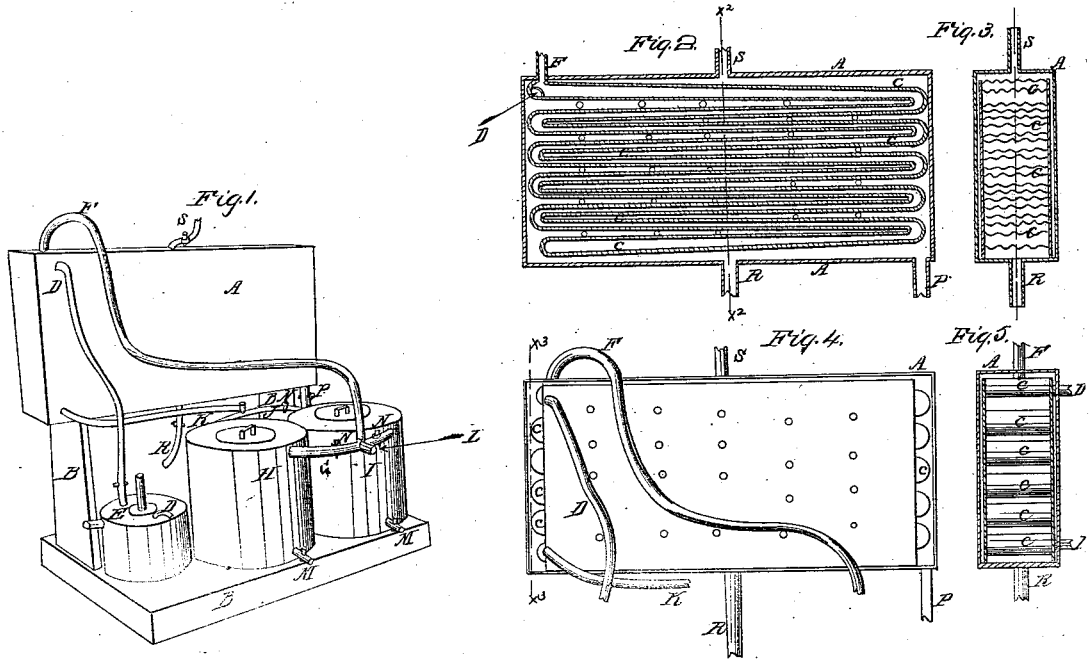

BENJAMIN IRVING, OF NEW YORK, N. Y.

Letters Patent No. 64,321, dated April 30, 1867.

---

IMPROVED PROCESS OF CONCENTRATING THE EXTRACT OF BARK FOR TANNING AND OTHER PURPOSES.

---

The Schedule referred to in these Letters Patent and making part of the same.

---

TO ALL WHOM IT MAY CONCERN:

Be it known that I, BENJAMIN IRVING, of the city, county, and State of New York, have invented a certain new and improved Process for Concentrating the Extracts from Bark for Tanning Purposes; and I do hereby declare that the following is a full description of the same.

The object of my invention is to obtain a concentrated extract from bark for tanning and other purposes, by a continuous distilling operation *in vacuo*. Heretofore all processes for concentrating liquid extracts have been carried on in open boilers or in vacuum-pans. The objection to open boilers is that the extract is too liable to be damaged by overheating, and to vacuum-pans that they are too slow of operation, and, unless greatly multiplied in numbers, unable to meet the demands of the leather-manufacturing interests for material to tan the hides. This is due to the fact that a vacuum-pan is capable of concentrating only a limited charge of extract at a single operation, therefore the time lost in "charging it," "heating up," "discharging it," and "cooling off," before a new charge can be put in the pan, makes up such an absolute loss of time as to preclude their use, (in an economical point of view,) for concentrating the extract of bark for tanning purposes. It is to overcome these difficulties, and to meet the demand for the extract of tannin, that I have invented a process for carrying on the operation of concentrating the extracts from bark continuously *in vacuo*. And the nature of my invention consists, first, in supplying to a flat worm, made of corrugated plates, the liquid extract in small jets or streams for the purpose of diffusing it evenly over the flat surfaces of the worm, so that it may evaporate quickly; second, in the method of evaporating the extract in the worm, by passing through it the extract only in a thin sheet or stratum, thereby leaving the major part of the interior space of the worm for method of carrying the liquid extract continuously from the inlet to the outlet of the worm, or series of the escape of the watery vapor eliminated from the extract to the exhausting-apparatus; third, in the evaporating tables, in a thin sheet, by means of a series of longitudinal channels or corrugations in the evaporating tables or worm, and thus presenting the greatest possible amount of evaporating surface for the action of the heat surrounding the worm; and fourth, in the method of concentrating the extract of bark continuously *in vacuo*, in evaporating tables or a flat worm, whereby the crude extract is being constantly admitted into its upper end, whilst the concentrated extract is being taken from its lower end. But to describe my invention more particularly, I will refer to the accompanying drawings, forming a part of this specification, the same letters of reference wherever they occur referring to like parts.

Figure 1 is a perspective view of the apparatus used in my process.

Figure 2 is a longitudinal cut section of the evaporating tables or flat worm through the line $x\ x$, fig. 3.

Figure 3 is a transverse cut section of the same through the line $x^2\ x^2$, fig. 2.

Figure 4 is a side view of the worm as arranged between side plates.

Figure 5 is an end view of the worm, through the line $x^3\ x^3$, fig. 4.

Figure 6 is a longitudinal cut section of the evaporating table or worm, through the line $x^4\ x^4$, fig. 2.

Letter A represents a steam-chamber or box, elevated upon a bed-plate or frame, B. In the steam-chamber is arranged a series of evaporating tables or flat worm, C, of one or more feet in width, and about three inches in depth, more or less, and of any length deemed necessary to carry on the operation of concentrating the extract. The upper and lower plates of the evaporating tables or worm are formed of plates of metal longitudinally corrugated. The object of this is to obtain, first, a greater amount of radiating surface in the worm than would be possible by any other form; second, to obtain a thin sheet or stratum of the liquid in the worm of varying depths, according to the depths of the corrugations in the plates, and thus expedite the evaporation of the water from the extract to concentrate it before it reaches the outlet; and third, to obtain the greatest amount of strength possible to sustain the pressure upon the broad surfaces of the tables. Into this worm is introduced the watery extract of the bark by means of a feed pipe, D, the end of which, $d^2$, extends entirely across the head of it. The object of this is to distribute the extract over the surface of the evaporating tables or worm, by means of a series of holes, $d^3$, in the sides of the pipe, corresponding with the corrugations in the table, so as to keep its entire surface covered with the extract. And as each successive evaporating table has corresponding corrugations in it, it will be obvious that the liquid, in falling from the end of one table, will fill the corrugations of the next table, and thus be carried to the outlet K. It will be obvious, also, that if the evaporating tables or worm were made of flat plates of metal instead of corrugated plates, this distribution of the liquids in a thin sheet would not be possible if there were the slightest depression of one side of the worm below the opposite side. In such case the liquid would run all to one side of the tables or worm, leaving the opposite side bare. By the use of the longitudinal corrugations in the worm, this is entirely corrected, and I am therefore enabled to present a thin and broad sheet of the extract to the action of the heat, that it may be concentrated with great rapidity, and at the same time, by its falling or dripping from the end of one table upon the next one below it, destroying the continuity of the sheet of liquor, and thus permit the watery vapor to separate more freely from it than if kept in an unbroken column. For the purpose of economizing heat in the evaporating operation, the outer end of the feed pipe D is passed through a steam condenser, E, so as to take up a portion of the heat from the waste steam of the apparatus. Letter F is a steam-exhaust pipe attached to the upper end of the worm, and connecting at its lower end with an exhausting pipe or apparatus L, through a branch pipe, G, connecting together two air-tight receiving tanks H and I. The object of the pipe F is to carry off the watery vapor of the extract as fast as evaporated, and thus produce a vacuum in the worm to enable me to carry on the concentration of the extract at a lower degree of heat than would be possible by any other continuous distilling process known. Letter K is a pipe attached to the lower end of the worm, and at its opposite end connected with the tanks H and I by means of a branch pipe, J. . The object of this arrangement is to carry off the concentrated extract from the worm and deposit it into the tanks H and I. To do this a vacuum is produced in the tanks by means of an exhausting-apparatus L, which by its connections with the worm, through the pipes F and K, also establishes a vacuum in the worm. By this means the liquid extract is supplied to the worm through the pipe D, the evaporated water of it exhausted from the worm by the pipe F, and the concentrated extract taken off to the receiving tanks H and I simultaneously, thus keeping up a continuous operation of concentrating the extract *in vacuo*. To draw off the concentrated extract from the tanks, taps M are inserted in their lower ends. And to admit of one tank being drawn from without interfering with the vacuum in the other tank, faucets N are inserted in the pipes G and J connecting the tanks together, so as to cut off all communication with the worm by either of the tanks while being emptied. Letter P is a steam pipe for charging the steam-chamber R, a pipe for carrying off the waste or condensed water in it, and S a gauge or safety-valve for indicating the pressure in the steam-chamber.

Having now described my improved process for concentrating the extracts from bark for tanning and other purposes, I will proceed to set forth what I claim, and desire to secure by Letters Patent of the United States:

I claim the method or process hereinbefore described of treating the extracts of bark for concentrating it by a continuous operation in a vacuum-worm or evaporating tables, substantially as set forth.

BENJAMIN IRVING.

Witnesses:
C. L. BARRITT,
J. H. MUNSON.